US008996479B2

(12) United States Patent
Haiby et al.

(10) Patent No.: US 8,996,479 B2
(45) Date of Patent: *Mar. 31, 2015

(54) COMPARING AND SELECTING DATA CLEANSING SERVICE PROVIDERS

(71) Applicant: Microsoft Corporation, Redmond, WA (US)

(72) Inventors: Neta Haiby, Hertzelia (IL); Elad Ziklik, Modiin (IL); Efim Hudis, Bellevue, WA (US); Gad Peleg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,906

(22) Filed: Aug. 13, 2013

(65) Prior Publication Data

US 2013/0332427 A1 Dec. 12, 2013

Related U.S. Application Data

(63) Continuation of application No. 12/893,791, filed on Sep. 29, 2010, now Pat. No. 8,510,276.

(51) Int. Cl.
*G06F 7/00* (2006.01)
*G06F 17/00* (2006.01)
*G06F 17/30* (2006.01)
*G06Q 10/00* (2012.01)
*G06Q 30/02* (2012.01)

(52) U.S. Cl.
CPC .......... *G06F 17/30303* (2013.01); *G06Q 10/00* (2013.01); *G06Q 30/02* (2013.01)
USPC ........................................................ 707/692

(58) Field of Classification Search
USPC ........................................................ 707/692
See application file for complete search history.

(56) References Cited

U.S. PATENT DOCUMENTS

| 6,167,405 | A | 12/2000 | Rosensteel, Jr. et al. |
|---|---|---|---|
| 8,219,523 | B2 | 7/2012 | Harush |
| 2006/0235715 | A1 | 10/2006 | Abrams |
| 2006/0247944 | A1 | 11/2006 | Calusinski, Jr. et al. |
| 2008/0195440 | A1 | 8/2008 | Bagchi |

(Continued)

OTHER PUBLICATIONS

Vitt, Elizabeth, et al., "Data Quality Solutions", MSDN, Microsoft SQL Server 9.0 Technical Articles, Jul. 2006, 15 pages.

(Continued)

*Primary Examiner* — Tony Mahmoudi
*Assistant Examiner* — Muluemebet Gurmu
(74) *Attorney, Agent, or Firm* — Kate Drakos; David Andrews; Micky Minhas

(57) ABSTRACT

The present invention extends to methods, systems, and computer program products for exploring and selecting data cleansing service providers. Embodiments of the invention permit a user to explore different data cleansing service providers and compare quality results from the different data cleansing service providers. Sample data is mapped to a specified data domain. A list of service providers, for cleansing data for the selected data domain, is provided to a user. The user selects a subset of service providers. The sample data is submitted to the subset of service providers, which return results including allegedly cleansed data. The results are profiled and a comparison of the subset of service providers is presented to the user. The user selects a service provider to use when cleansing further data.

20 Claims, 3 Drawing Sheets

(56) References Cited

U.S. PATENT DOCUMENTS

2008/0235288 A1    9/2008   Harush
2009/0234826 A1    9/2009   Bidlack

OTHER PUBLICATIONS

Global IDs, "Data Steward", Based on information and belief available, at least as early as Aug. 4, 2010, 2 pages.

English, Larry, "Information Quality in Reference Data", Information Management Magazine, Mar. 2006, 3 pages.

Sarsfield, Steve, "Data Governance and Data Quality Insider", Feb. 22, 2010, 7 pages.

Goasdoue, Virginie, et al., "An Evaluation Framework for Data Quality Tools", Based on information and belief available, at least as early as Aug. 4, 2010, 15 pages.

Office Action cited in U.S. Appl. No. 12/893,791, mailed Nov. 7, 2012.

Notice of Allowance cited in U.S. Appl. No. 12/893,791, mailed Apr. 15, 2013.

"Second Office Action Issued for China Patent Application No. 201110307767.5", Mailed Date: Jan. 26, 2014, 6 Pages.

COMPARING AND SELECTING DATA CLEANSING SERVICE PROVIDERS

CROSS-REFERENCE TO RELATED APPLICATIONS

This application is a continuation of U.S. patent application Ser. No. 12/893,791, entitled "COMPARING AND SELECTING DATA CLEANSING SERVICE PROVIDERS," which was filed on Sep. 29, 2010, and which is incorporated herein by reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, various different types of data are stored in and accessed from databases. Some databases store data of specified types, such as, for example, customer addresses, employee information, etc. Often, data is manually entered into databases. Manual data entry is prone to human error. Further, many errors once entered become virtually undetectable, because once the data is entered there is little if any further human interaction with the data. Additionally, some errors, such as, for an extra digit in a telephone number, may be difficult to identify. Other data inconsistencies can be caused by different data dictionary definitions of similar entities in different stores or by transmission and/or storage errors. Thus over time, a database can accumulate various data errors and inconsistencies Administratively, incorrect or inconsistent data can lead to false conclusions and misdirected investments on both public and private scales. For example, the government may want to analyze population census figures to decide which regions require further spending and investment on infrastructure and services. In this case, it will be important to have access to reliable data to avoid erroneous fiscal decisions.

In the business world, incorrect data can be costly. Many companies use customer information databases that record data like contact information, addresses, and preferences. If for instance the addresses are inconsistent, the company will suffer the cost of resending mail or even losing customers.

Accordingly, from time to time, database administrators can "cleanse" or "scrub" data. Data cleansing or data scrubbing includes detecting and correcting (or removing) corrupt or inaccurate records from a record set, table, or database. Often used in databases, data cleansing or scrubbing can identify incomplete, incorrect, inaccurate, irrelevant etc. parts of data and then replace, modify or delete this "dirty data. After cleansing, a data set is (at least more) consistent with other similar data sets.

The actual process of data cleansing may involve removing typographical errors or validating and correcting values against a known list of entities. The validation may be strict (such as rejecting any address that does not have a valid postal code) or fuzzy (such as correcting records that partially match existing, known records).

A list of know entities can be provided by a data cleansing service provider configured for cleansing a specified type of data. For example, a data cleansing service can be configured to cleanse postal address or telephone numbers in the United States. For some types of data, a (potential large) plurality of different data cleansing service providers can exist. However, the sufficiency of results from different data cleansing service providers can vary significantly. Evaluating a number of different data cleansing service providers to identify a "best" data cleansing service for a specified type of data can be a manual and labor intensive processes

BRIEF SUMMARY

The present invention extends to methods, systems, and computer program products for comparing and selecting data cleansing service providers. In some embodiments, a reference data service provider is identified for cleansing. A sample source of data is mapped to a selected data domain. The data domain is associated with data elements having specified arrangement of data. The sample source of data has known data inconsistencies.

A list of a plurality of reference data service providers configured to cleanse data elements for data in the selected data domain. A selection of a subset of plurality of reference data service providers that are to be explored is received. The sample source of data is submitted to each reference data service provider in the subset of reference data service providers. Results of cleansing the sample source of data received back from each reference data service provider in the subset of reference data service providers. For each reference data service provider, the results include an allegedly cleansed sample source of data derived from the sample source of data.

The results from each of the reference data service providers in the subset of the plurality of reference data service providers are profiled. Profiling includes determining how each reference data service provider dealt with the known data inconsistencies in the sample source of data. A comparison between the subset of the plurality of reference data service providers is displayed on a display device. The displayed comparison is based on the profiled results. A user selection of a reference data service provider is received from the displayed comparison. The selected reference data service provider is indicated as appropriate for cleansing further data in the data domain.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
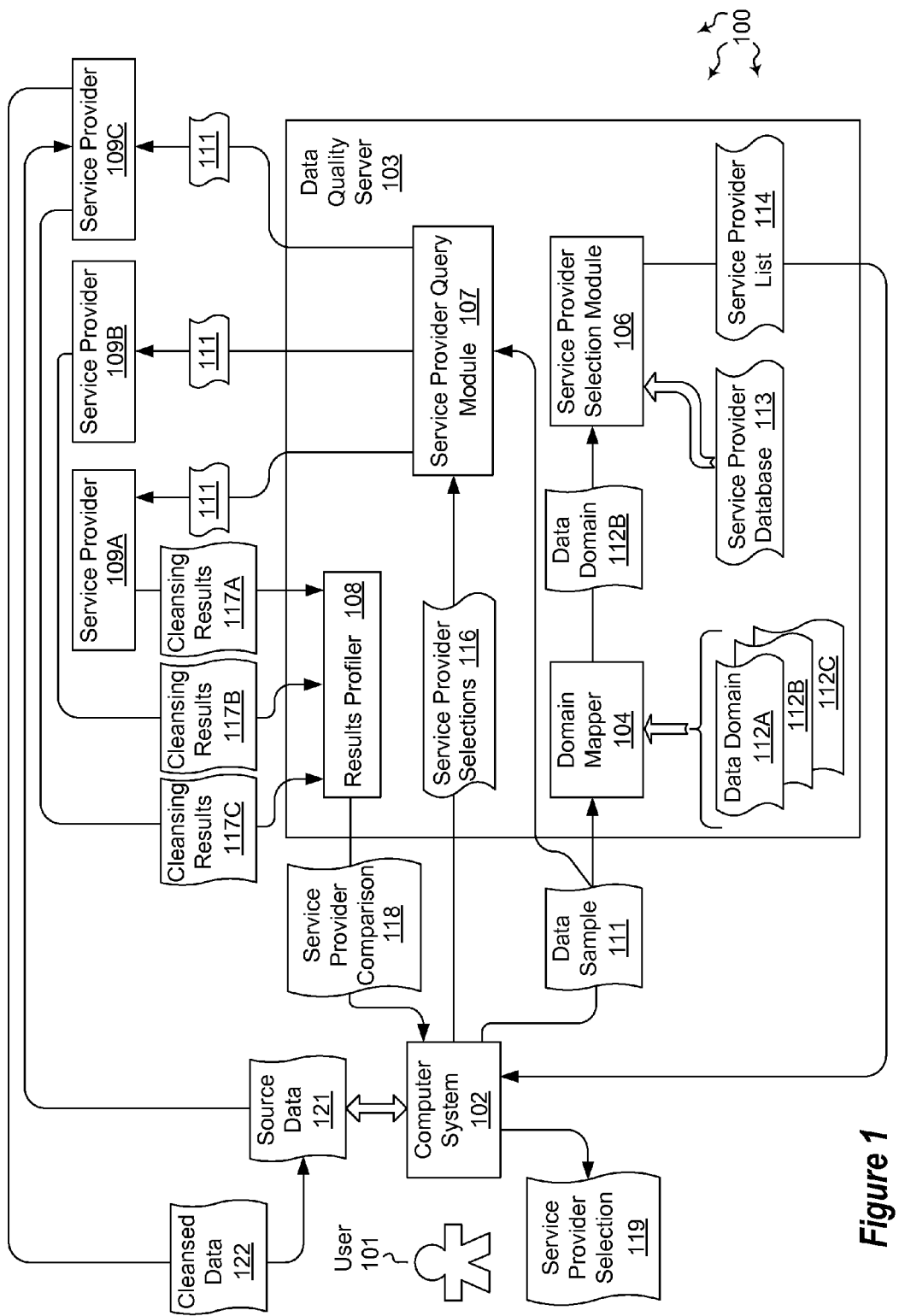
FIG. 1 illustrates an example computer architecture that facilitates comparing and selecting data cleansing service providers.

The present invention extends to methods, systems, and computer program products for comparing and selecting data cleansing service providers. In some embodiments, a reference data service provider is identified for cleansing. A sample source of data is mapped to a selected data domain. The data domain is associated with data elements having specified arrangement of data. The sample source of data has known data inconsistencies.

A list of a plurality of reference data service providers configured to cleanse data elements for data in the selected data domain. A selection of a subset of plurality of reference data service providers that are to be explored is received. The sample source of data is submitted to each reference data service provider in the subset of reference data service providers. Results of cleansing the sample source of data received back from each reference data service provider in the subset of reference data service providers. For each reference data service provider, the results include an allegedly cleansed sample source of data derived from the sample source of data.

The results from each of the reference data service providers in the subset of the plurality of reference data service providers are profiled. Profiling includes determining how each reference data service provider dealt with the known data inconsistencies in the sample source of data. A comparison between the subset of the plurality of reference data service providers is displayed on a display device. The displayed comparison is based on the profiled results. A user selection of a reference data service provider is received from the displayed comparison. The selected reference data service provider is indicated as appropriate for cleansing further data in the data domains.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other hardware storage device which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates comparing and selecting data cleansing service providers. Referring to FIG. 1, computer architecture 100 includes computer system 102 and data quality server 103. Data quality server 103 further includes domain mapper 104, service provider selection module 106, service provider query module 107, and results profiler 108. Each of the depicted computer systems and components can be connected to one another over (or is part of) a network, such as, for example, a Local Area Network ("LAN"), a Wide Area Network ("WAN"), and even the Internet. Accordingly, each of the depicted computer systems and components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, source data 121 can be some stored in some type of data repository, such as, for example, a file, a table, a database, etc. Source data 121 can be a specified type of data, such as, for example, customer data, employee data, mailing address data, telephone number data, mathematical calculations, statistical data, corporate data, financial data, economic data, geographic data, etc.

In general, data quality server 103 assists user 102 in exploring different reference data service providers and comparing data quality results. Sample data can be cleansed and profiled against different reference service providers in order to increase quality.

Domain mapper 104 is configuring to receive a sample source of data and map the sample source of data to a data domain. Domain mapper 104 has access to data defining a variety of different data domains, such as, for example, data domains 112A, 112B, 112C, etc. Each data domain can correspond to a type of data, such as, for example, customer data, employee data, mailing address data, telephone number data, mathematical calculations, statistical data, corporate data, financial data, economic data, geographic data, etc. Data domains can also be specific to a particular country, region, topic, or category. For example, a data domain for United States mailing addresses can differ from a data domain for United Kingdom mailing addresses.

Upon receiving a sample source of data, domain mapper 104 can compare the arrangement and/or format of data elements in the received sample source of data to data defining each of the different data domains. When the arrangement and/or of format of data elements is similar (or matches) to data defining a particular data domain, that data domain can be selected for the sample source of data.

Service provider selection module 106 is configured to receive an indication of data domain and identify a list of data cleansing service providers that cleanse data for the data domain. Service provider selection module 106 can refer to service provider database 113. Service provider database 113 can maintain lists of data cleansing service providers for different data domains. Service provider selection module 106 can match a data domain to a plurality of data cleansing service providers in service provider database 113 that cleanse data for the data domain. Service provider selection module 106 can return a list of the plurality of data cleansing to computer system 102 for viewing by user 102 (e.g., on a display device).

Service provider query module 107 is configured to receive a user selection of one or more data cleansing service providers. In response to the user selection, service provider query module 107 submits a sample source of data to each of the one or more data cleansing service providers.

Cleansing results from each of the one or more data cleansing service providers are returned to results profiler 108. Results profiler 108 profiles the cleansing results. Profiling can include determining how each data cleansing service provider addressed known data inconsistencies in a sample source of data. Results profiler 108 can generate a service provider comparison for presentation to a user (e.g., on a display device)

Figure 2:
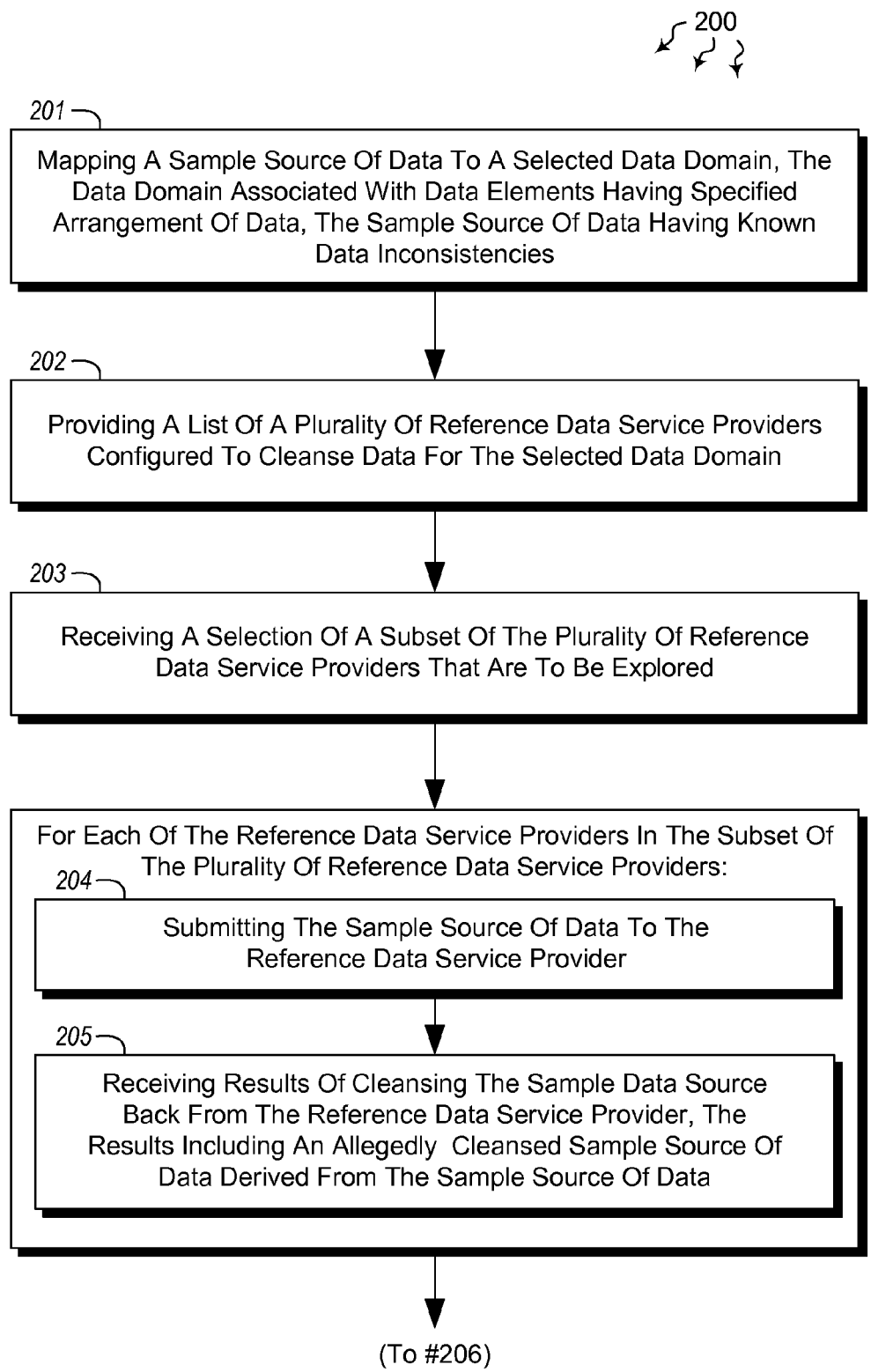
FIG. 2 illustrates a flow chart of an example method for identifying a data cleansing service provider for cleansing data.
Figure 2:
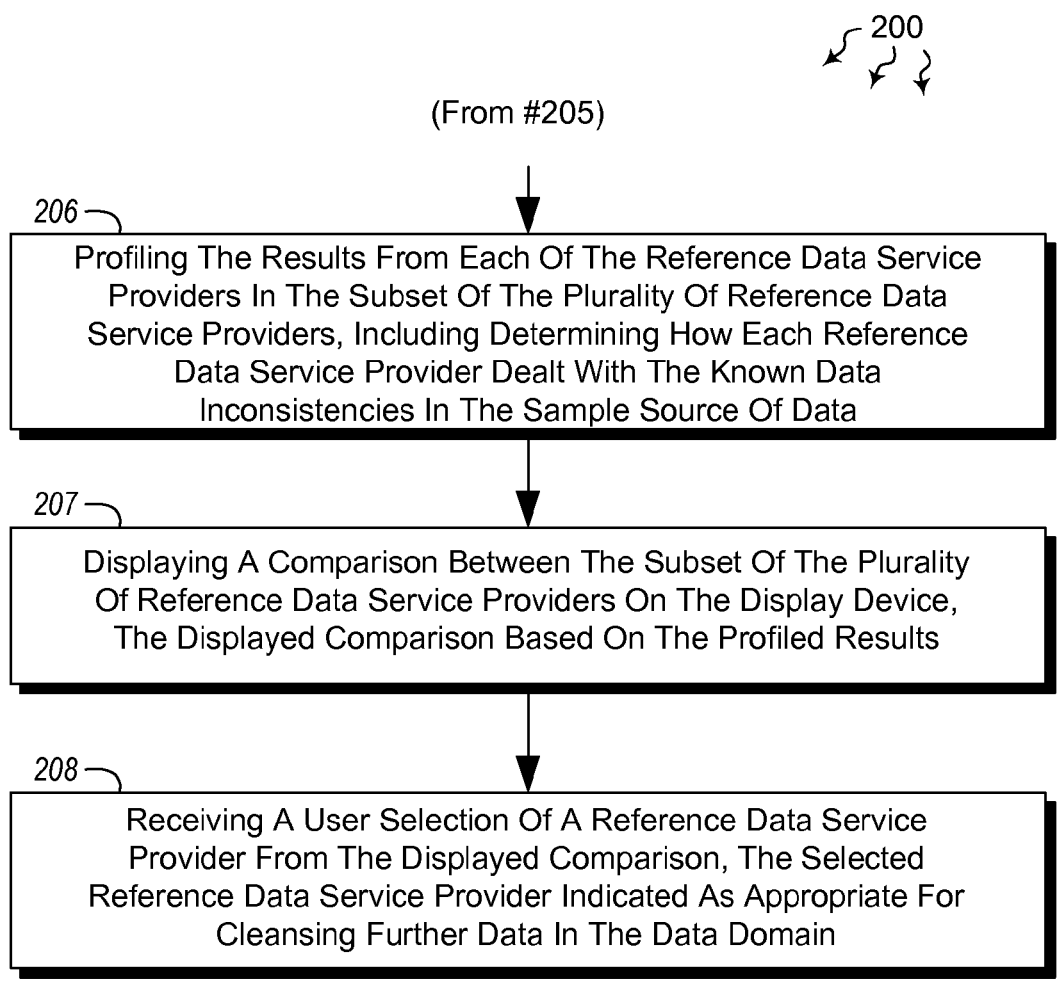

FIG. 2 illustrates a flow chart of an example method 200 for identifying a data cleansing service provider for cleansing data. Method 200 will be described with respect to the components and data of computer architecture 100.

User 101 is a user of computer system 102. User 101 may be desirous of finding a service provider to cleanse source data 121. As such, computer 102 (at the instruction of user 101) can submit data sample 111 to data quality server 103. Data sample 111 can be a representative portion of source data 121 or other data that is similarly formatted. Sample data 111 can include known data inconsistencies (e.g., incomplete data, incorrect data, inaccurate data, irrelevant data, etc.)

Method 200 includes an act of mapping a sample source of data to a selected data domain, the data domain associated with data elements having specified arrangement of data, the sample source of data having known data inconsistencies (act 201). For example, domain mapper 104 can receive data sample 111. Domain mapper 106 can identify an appropriate (e.g., a most closely matching) data domain for data sample 111 based on the arrangement and content of data elements in data sample 111. For example, domain mapper 106 can map data sample 111 to data domain 112B.

Method 200 includes an act of providing a list of a plurality of reference data service providers configured to cleanse data in the selected data domain (act 202). For example, domain mapper 104 can send data domain 112B to service provider selection module 106. Service provider selection module 106 can refer to service provider database 113 to obtain a list of a plurality of data cleansing service providers configured to cleanse data for data domain 112B. Service provider selection module 106 can include the list of the plurality of data cleansing service providers in service provider list 114. Service provider selection module 106 can send service provider list 114 to computer system 102.

Computer system 102 can receive service provider list 114. Computer system 102 can display service provider list 114 to user 102 on a display device. Using input devices, user 101 can select one or more (and potentially all) of the data cleansing service providers included in service provider list 114 for exploration based on data sample 111. For example, user 101 can select service providers 109A, 109B, and 109C from service provider list 114. Computer 102 (at the direction of user 101) can then send the service provider selections back to data quality server 103. For example, computer 102 can send service provider selections 116 to data quality server 103. Service provider selections 116 can identify service providers 109A, 109B, and 109C for exploration.

Method 200 includes an act of receiving a selection of a subset of the plurality of reference data service providers that are to be explored (act 203). For example, service provider query module 107 can receive service provider selections 116.

For each of the reference data service providers in the subset of the plurality of reference data service providers, method 200 includes an act of submitting the sample source of data to the reference data service provider (act 204). For example, service provider query module can submit data sample 111 to each of service providers 109A, 109B, and 109C.

For each of the reference data service providers in the subset of the plurality of reference data service providers, method 200 includes an act of receiving results of cleansing the sample data source back from the reference data service provider, the results including an allegedly cleansed sample source of data derived from the sample source of data (act 205). For example, results profiler 108 can receive cleansing results 117A, 117B, and 117C from service providers 109A, 109B, and 109C respectively. Each of cleansing results 117A, 117B, and 117C can include an allegedly cleansed data sample derived from data sample 111.

Method 200 includes an act of profiling the results from each of the reference data service providers in the subset of the plurality of reference data service providers, including determining how each reference data service provider dealt with the known data inconsistencies in the sample source of data (act 206). For example, results profiler 108 can profile each of cleansing results 117A, 117B, and 117C. From results 117A, 117B, and 117C, results profiler 108 can determine how each of service provider 109A, 109B, and 109C respectively dealt with the known data inconsistencies in data sample 111.

Profiling cleansing results can include one or more of: identifying false negatives (inconsistencies that were not addressed) within the cleansing results, identifying false positives (changes to consistence data) within the cleansing results, and determining if supplemental enrichment data (e.g., geo coding data) is included.

From the profiled results, results profiler 108 can generate a quality of service value for each data cleansing service provider. For example, results profiler 108 can generate a quality of service value for each of service provider 109A, 109B, and 109C from the profiling of results 117A, 117B, and 117C respectively. The quality of service value provides an overall rating for how well a service provider cleansed data sample 111.

Results profiler 108 can include quality of service values and potentially other profiling data for each of service provider 109A, 109B, and 109C in service provider comparison 118. Results profiler 108 can send service provider comparison 118 to computer system 102.

Method 200 includes an act of displaying a comparison between the subset of the plurality of reference data service providers on the display device, the displayed comparison based on the profiled results (act 207). For example, computer system 102 can display service provider comparison 118 to user 101 on a display device.

Method 200 includes an act of receiving a user selection of a reference data service provider from the displayed comparison, the selected reference data service provider indicated as appropriate for cleansing further data in the data domain (act 208). For example, computer system 102 can receive service provider selection 119 from user 102. Server provider selection 119 can indicate that service provider 109C has been selected to cleanse source data 121.

In response to service provider selection 119 or at some other time, computer system 102 can submit source data 121 to service provider 109C. Service provider 109C can cleanse source data 121 to generate cleansed data 122. Service provider 109C can returned cleansed data 122. Cleansed data 123 can be merged back into source data 121.

Accordingly, embodiments of the invention permit a user to explore different data cleansing service providers and compare quality results from the different data cleansing service providers with increased automation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including one or more processors, system memory, and a display device, the computer system also including a data quality module, a method for identifying a reference data service provider for cleansing data, the method comprising:
   receiving a sample source of data, the sample source of data having known data inconsistencies;
   providing a list of a plurality of reference data service providers configured to cleanse data in a selected data domain;
   an act of receiving a selection of a plurality of reference data service providers that are to be explored, each of the reference service providers is configured to cleanse data;
   for each of the reference data service providers in the plurality of data service providers:
     an act of submitting the sample source of data to the reference data service provider; and
     an act of receiving results of cleansing the sample data source back from the reference data service provider, the results including an allegedly cleansed sample source of data derived from the sample source of data;
   an act of profiling the results from each of the reference data service providers in the plurality of reference data service providers, including determining how each reference data service provider dealt with the known data inconsistencies in the sample source of data; and
   an act of displaying a comparison between the plurality of reference data service providers on the display device, the displayed comparison based on the profiled results.

2. The method as recited in claim 1, wherein determining a selected data domain comprises an act of mapping to a data domain selected from among: customer data, employee data, mailing address data, telephone number data, mathematical calculations, statistical data, corporate data, financial data, economic data, and geographic data.

3. The method as recited in claim 1, wherein determining a selected data domain comprises an act of mapping to a data domain that is specific to a particular country, region, topic, or category.

4. The method as recited in claim 1, wherein the list of a plurality of reference data service providers configured to cleanse data in a selected data domain is selected from among: customer data, employee data, mailing address data, telephone number data, mathematical calculations, statistical data, corporate data, financial data, economic data, and geographic data.

5. The method as recited in claim 1, wherein the act of profiling the results from each of the reference data service providers in the plurality of service providers comprises an act of determining the number of false negatives from each of the reference data service providers.

6. The method as recited in claim 1, wherein the act of profiling the results from each of the reference data service providers in the plurality of service providers comprises an act of determining the number of false positives from each of the reference data service providers.

7. The method as recited in claim 1, wherein the act of profiling the results from each of the reference data service providers in the plurality of reference data service providers comprises an act of determining if any of the reference data service providers enriched the results with other data.

8. The method as recited in claim 1, further comprising:
    determining the selected domain by comparing the sample source of data to data defining each of a plurality of different data domains;
    receiving a user selection of a reference data service provider from the displayed comparison, the selected reference data service provider indicated as appropriate for cleansing further data in the data domain; and
    generating a quality of service value for each of the reference data service providers in the plurality of reference data service providers.

9. A computer program product for use at a computer system, the computer program product for implementing a method for identifying a reference data service provider for cleansing data, the computer program product comprising one or more computer storage devices having stored thereon computer-executable instructions that, when executed at a processor, cause the computer system to perform the method, including the following:
    receive a sample source of data, the sample source of data having known data inconsistencies;
    providing a list of a plurality of reference data service providers configured to cleanse data in a selected data domain;
    receive a selection of a plurality of reference data service providers that are to be explored, each of the reference service providers is configured to cleanse data;
    for each of the reference data service providers in the plurality of reference data service providers:
        submit the sample source of data to the reference data service provider; and
        receive results of cleansing the sample data source back from the reference data service provider, the results including an allegedly cleansed sample source of data derived from the sample source of data;
    profile the results from each of the reference data service providers in the plurality of reference data service providers, including determining how each reference data service provider dealt with the known data inconsistencies in the sample source of data; and
    display a comparison between the plurality of reference data service providers on a display device, the displayed comparison based on the profiled results.

10. The computer program product as recited in claim 9, wherein computer-executable instructions that, when executed, cause the computer system to determine a selected data domain comprise computer-executable instructions that, when executed, cause the computer system to map to a data domain selected from among: customer data, employee data, mailing address data, telephone number data, mathematical calculations, statistical data, corporate data, financial data, economic data, and geographic data.

11. The computer program product as recited in claim 9, wherein computer-executable instructions that, when executed, cause the computer system to determine a selected data domain comprise computer-executable instructions that, when executed, cause the computer system to map to a data domain that is specific to a particular country, region, topic, or category.

12. The computer program product as recited in claim 9, wherein the list of a plurality of reference data service providers configured to cleanse data in a selected data domain, are selected from among: customer data, employee data, mailing address data, telephone number data, mathematical calculations, statistical data, corporate data, financial data, economic data, and geographic data.

13. The computer program product as recited in claim 9, further comprising computer-executable instructions that, when executed, cause the computer system to:
    determine the selected domain by comparing the sample source of data to data defining each of a plurality of different data domains; and
    receive a user selection of a reference data service provider from the displayed comparison, the selected reference data service provider indicated as appropriate for cleansing further data in the data domain.

14. The computer program product as recited in claim 9, wherein computer-executable instructions that, when executed, cause the computer system to profile the results from each of the reference data service providers in the plurality of reference data service providers comprise wherein computer-executable instructions that, when executed, cause the computer system to determine the number of false positives from each of the reference data service providers.

15. The computer program product as recited in claim 9, wherein computer-executable instructions that, when executed, cause the computer system to profile the results from each of the reference data service providers in the plurality of reference data service providers comprise wherein computer-executable instructions that, when executed, cause the computer system to determine if any of the reference data services providers enriched the results with other data.

16. The computer program product as recited in claim 9, further comprising wherein computer-executable instructions that, when executed, cause the computer system to generate a quality of service value for each of the reference data service providers in the plurality of reference data service providers.

17. A data cleansing system, the data cleansing system comprising:
    a user computer system, the use computer system including one or more processors and system memory;
    a plurality of reference data service providers, each data cleansing service provider configured to cleanse data in a specified data domain; and
    a data cleansing server, the data cleansing server including:
        one or more processors;
        system memory; and
        one or more computer storage devices having stored thereon computer-executable instructions representing a domain mapper, a service provider selection module, a service provider query module, and a results profiler, wherein the domain mapper is configured to:
            receive a sample source of data from the user computer system, the sample source of data having known data inconsistencies;
            determine a selected domain by comparing the sample source of data to data defining each of a plurality of different data domains; and
            send a selected data domain to the service provider selection module;
        wherein the service provider selection module is configured to:
            receive the selected data domain from the domain mapper;

refer to a service provider database to identify a list of reference data service providers, from among the plurality of data cleansing service providers, configured to cleanse data in the selected data domain;

provide the list of reference data service providers to the user computer system;

wherein the service provider query module is configured to:

receive a sample source of data from the user computer system;

receive a selection of a subset of reference data service providers from the list of reference data service providers, the selected subset of reference data service providers identifying reference data service providers that are to be explored;

for each of the reference data service providers in the subset of reference data service providers, submit the sample source of data to the reference data service provider;

for each of the reference data service providers in the subset of reference data service providers, receive results of cleansing the sample data source back from the reference data service provider, the results including an allegedly cleansed sample source of data derived from the sample source of data;

profile the results from each of the reference data service providers in the subset of reference data service providers, including determining how each service provider dealt with the known data inconsistencies in the sample source of data;

generate a comparison between the subset of reference data service providers based on the profiled results; and send the comparison to the user computer system.

18. The data cleansing system as recited in claim 17, wherein the domain mapper being configured to determine a selected data domain comprises the domain mapper being configured to map the sample source of data to a selected data domain selected from among: customer data, employee data, mailing address data, telephone number data, mathematical calculations, statistical data, corporate data, financial data, economic data, and geographic data.

19. The data cleansing system as recited in claim 17, wherein the results profiler being configured to profile the results from each of the reference data service providers in the subset of reference data service providers comprises the results profiler being configured to profile false negatives, false positives, and enriching data for each of the reference data service providers in the subset of reference data service providers.

20. The data cleansing system as recited in claim 17, wherein the results profiler being is further configured to generate a quality of service value for each of the reference data service providers in the subset of reference data service providers.

* * * * *